June 26, 1928. Re. 17,012

A. LÄUFER

WHIRLPOOL FILLING AND PARRYING PLANT

Original Filed Dec. 10, 1921

INVENTOR.
August Läufer;
BY A. B. Foster
ATTORNEY

Reissued June 26, 1928. Re. 17,012

UNITED STATES PATENT OFFICE.

AUGUST LÄUFER, OF VIENNA, AUSTRIA.

WHIRLPOOL FILLING AND PARRYING PLANT.

Original No. 1,544,996, dated July 7, 1925, Serial No. 521,492, filed December 10, 1921, and in Austria January 18, 1921. Application for reissue filed May 10, 1928. Serial No. 276,719.

This invention relates to a whirlpool filling and parrying plant designed to prevent damages caused by the whirlpool behind (on the down-stream side of) a construction such as a weir, in the water.

By "weir" as used herein is meant any construction used for holding back or impounding the waters of a flowing stream or other body of water and over or past which water, at least at certain periods, will flow. The term therefore includes gates and other barrage constructions.

According to the present invention a suction channel is provided, which is located in front of (on the up-stream side of) a protecting plate, in order to utilize the power of the water falling over the construction for sucking off the water from below the protecting plate for producing the drifting of broken stones or gravel by the production of an eddy current moving towards the weir and thereby preventing consequent excavation of the bottom of the stream or tailrace just below the weir.

A few modes of carrying out the present invention are shown, by way of example, in the accompanying drawing in which Figs. 1 and 2 illustrate in longitudinal section and plan view respectively, the device as applied to a fixed weir.

The plant comprises a protecting apron or plate to deflect the falling water stream from the bottom of the stream bed and transform it into a harmless wavy stream, the plate and weir being so arranged that an eddy or counter current will be produced beneath the plate moving upstream over the stream bed.

The root of the protecting plate *a* is not built directly against the body of the weir, but begins some distance away from the body portion of the masonry of the weir, so that the space thus formed between the said body portion and the root of the plate may act as a suction channel for sucking in the water from the space *e* below the plate and thus upstream from the downstream end of such space, and this may be accomplished by inclining the upper end of the channel *b* in a downstream direction or the upper mouth of the suction channel may terminate in a rarefied space *f* such as is frequently produced under certain conditions below the falling stream.

Figure 1:
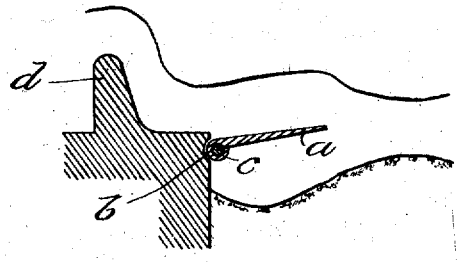
Figure 2:
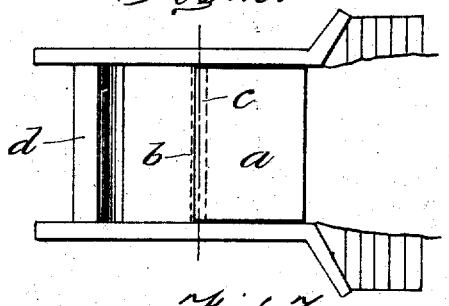
Figure 3:
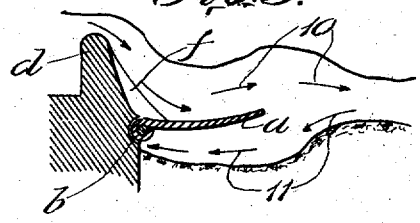
Fig. 3 shows a modified construction of a weir with the end of the suction channel terminating in the rarefied space.
Figure 4:
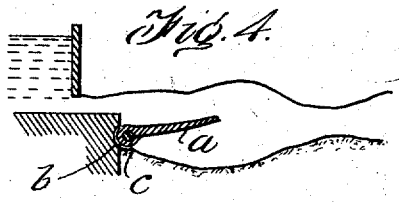
Fig. 4 illustrates the application of the device to a sluice weir or gate.

The characteristic feature of the plant according to the present invention consists in that the effect of suction of the falling stream is utilized to produce a current along the under side of the plate *a* and at the bottom of the space *e* which is directed towards the weir *d*, the said current causing a considerable drift of broken stones or gravel towards the weir and producing an eddy which will carry much of any solid material transported over the structure upstream beneath the protecting plate where it will be deposited. The power which is thus produced by the falling stream diminishes the inertia or inherent energy of said falling stream, thereby reducing its damaging effect. In order to adapt the deflection and transformation of the falling stream to local conditions and at the same time to facilitate the sucking effect, the plate *a* may be of straight or curved formation and movable or immovable. This plate is spaced away slightly from the base of the weir, leaving a narrow space *b*. The necessary inclination of the plate with respect to the falling stream may be adjusted by raising or lowering the same by means of suitable arrangements, or the said plate may be raised or lowered automatically by means of the floating moment of the plate. The curvature of the plate secures a constant striking angle of the stream of water with varying water levels, which has a decided influence upon the action of the suction channel. The device may be executed in any desired material, for instance in concrete, iron or wood constructions and so forth. The flow of water under these conditions is illustrated by the arrows in Fig. 3 wherein the arrows 10 indicate the downstream flow and the arrows 11 indicate the upstream eddy produced by the suction through the passage *b*.

I claim:—

1. A weir having an extension downstream from its downstream side and overhanging the stream bed in spaced relation thereto to form a chamber under said extension, said weir having a suction passage leading from the chamber and having a mouth opening through the structure in position to have water passing the weir flow past said mouth to effect suction in an upward direction through the passage and in an upstream direction beneath the overhanging extension.

2. A weir having an extension downstream from its downstream side and overhanging the stream bed in spaced relation thereto to form a chamber under said extension, said weir having a suction passage leading from the chamber and having a mouth opening through the structure in position to have water passing the weir flow past said mouth to effect suction in an upward direction through the passage and in an upstream direction beneath the overhanging extension, said extension comprising a protecting plate secured in spaced relation to the body of the weir whereby the space between the plate and body of the weir forms the suction passage.

3. A weir having an extension downstream from its downstream side and overhanging the stream bed in spaced relation thereto to form a chamber under said extension, said weir having a suction passage leading from the chamber and having a mouth opening through the structure in position to have water passing the weir flow past said mouth to effect suction in an upward direction through the passage and in an upstream direction beneath the overhanging extension, said extension comprising a protecting plate secured in spaced relation to the body of the weir whereby the space between the plate and body of the weir forms the suction passage, said plate being inclined to have its downstream edge higher than the edge adjacent the body of the weir.

4. A weir having an extension downstream from its downstream side and overhanging the stream bed in spaced relation thereto to form a chamber under said extension, said weir having a suction passage leading from the chamber and having a mouth opening through the structure in position to have water passing the weir flow past said mouth to effect suction in an upward direction through the passage and in an upstream direction beneath the overhanging extension, said extension comprising a protecting plate secured in spaced relation to the body of the weir whereby the space between the plate and body of the weir forms the suction passage, said plate being arcuately curved to have its downstream edge higher than the edge adjacent the body of the weir.

5. A weir having an extension downstream from its downstream side and overhanging the stream bed in spaced relation thereto to form a chamber under said extension, said weir having a suction passage leading from the chamber and having a mouth opening through the structure in position to have water passing the weir flow past said mouth to effect suction in an upward direction through the passage and in an upstream direction beneath the overhanging extension, said extension comprising a protecting plate secured in spaced relation to the body of the weir whereby the space between the plate and body of the weir forms the suction passage, said plate being hinged at its upstream edge to permit vertical adjustment of the downstream edge.

6. A weir having an extension downstream from its downstream side and overhanging the stream bed in spaced relation thereto to form a chamber under said extension, said weir having a suction passage leading from the chamber and having a mouth opening through the structure in position to have water passing the weir flow past said mouth to effect suction in an upward direction through the passage and in an upstream direction beneath the overhanging extension, said extension comprising a protecting plate secured in spaced relation to the body of the weir whereby the space between the plate and body of the weir forms the suction passage, said plate being inclined to have its downstream edge higher than the edge adjacent the body of the weir, said plate being hinged at its upstream edge to permit vertical adjustment of its downstream edge.

7. A weir having an extension downstream from its downstream side and overhanging the stream bed in spaced relation thereto to form a chamber under said extension, said weir having a suction passage leading from the chamber and having a mouth opening through the structure in position to have water passing the weir flow past said mouth to effect suction in an upward direction through the passage and in an upstream direction beneath the overhanging extension, said extension comprising a protecting plate secured in spaced relation to the body of the weir whereby the space between the plate and body of the weir forms the suction passage, said plate being arcuately curved to have its downstream edge higher than the edge adjacent the body of the weir, said plate being hinged at its upstream edge to permit vertical adjustment of its downstream edge.

AUGUST LÄUFER.